3,536,683
PROCESS FOR ISOLATING A FLUORINE-CONTAINING POLYMER
Frank Vincent Bailor, New Castle, and John Richard Cooper, Hockessin, Del., assignors to E. I. du Pont de Nemours and Company, Wilmington, Del., a corporation of Delaware
No Drawing. Filed Apr. 7, 1967, Ser. No. 629,099
Int. Cl. C08f *1/92, 15/32*
U.S. Cl. 260—87.7                                                                7 Claims

ABSTRACT OF THE DISCLOSURE

Isolation of fluorine-containing polymers (e.g., vinylidene fluoride/hexafluoropropene copolymers) from aqueous emulsions by (1) aging to partially destabilize the emulsion, (2) conditioning for centrifuging by adding a water-soluble electrolyte such as aluminum potassium sulfate, (3) centrifuging the conditioned emulsion, (4) masticating the solids into a crumb, (5) washing the polymer crumb with water, (6) centrifuging to remove the water, and (7) drying the polymer obtained.

BACKGROUND OF THE INVENTION

Field of the invention

This invention relates to isolation processes for fluorine-containing polymers and, more particularly, their isolation from aqueous emulsions.

Description of the prior art

Most fluorine-containing polymers, such as the vinylidene fluoride/hexafluoropropene copolymers of Rexford U.S. Pat. 3,051,677, are prepared by emulsion polymerization in water using a redox catalyst. It becomes necessary, therefore, to isolate the polymer from the emulsion. The method set forth in the Rexford patent is complete coagulation by the addition of dilute hydrochloric acid, washing of the coagulated crumb with water, and rolling the crumb on a hot rubber mill at about 140° C. to obtain the elastomer in roll-shaped form.

It is highly desirable to prepare the polymer as a dry crumb which is free from the inclusion of undesirable coagulating agents. Such an isolation process should also maintain the polymer at each stage of the process in such a form that it is easily handled and the operation of that stage is effectively carried out.

SUMMARY OF THE INVENTION

It has been found that fluorine-containing polymers can be conveniently isolated from their aqueous emulsions by a process which comprises (1) aging for a sufficient time and temperature to partially destabilize the emulsion, (2) conditioning the emulsion for centrifuging by adding a water-soluble electrolyte, (3) centrifuging the conditioned emulsion to separate the polymer from the supernatant liquid, (4) optionally, masticating the solids into a crumb, (5) washing the polymer solids with water to reduce the residual acidity below about 0.07 milliequivalent of hydrogen ion per gram of polymer, (6) drying the polymer to a water content below about 1%.

DESCRIPTION OF PREFERRED EMBODIMENTS

While this invention is applicable to the isolation of fluorine-containing polymers generally, it is particularly suited for the isolation of vinylidene fluoride copolymers such as vinylidene fluoride/hexafluoropropene copolymers and vinylidene fluoride/hexafluoropropene/tetrafluoroethylene terpolymers. Various fluorine-containing polymers are disclosed in Rexford U.S. Pat. 3,051,677; Pailthorp & Schroeder U.S. Pat. 2,968,649; Dittman et al. U.S. Pats. 2,738,343 and 2,752,331; Hanford & Roland U.S. Pat. 2,468,664; Brubaker U.S. Pat. 2,393,967; and Honn et al. U.S Pats 2,833,752 and 2,965,619.

Several of the aforementioned references describe the emulsion polymerization of the particular polymers. The particular method employed to arrive at the polymer emulsion is not especially critical to this invention and suitable methods are well known to those skilled in the art. Suitable emulsions contain from about 10% to about 40% solid polymer by weight; however, concentrations of about 15 to 20 weight percent are preferred.

The aging step depends upon a time-temperature relationship, that is, the longer the time, the lower the temperature required and vice versa. In general, the times will range from about 1 to 24 hours and the temperature will range from about 20° C. to 100° C. Those skilled in the art can readily select the particular time and temperature best suited to the particular polymer being isolated.

The addition of water-soluble electrolyte, following the aging step is to condition the emulsion for centrifuging. Many water-soluble electrolytes are suitable for this purpose. The preferred electrolytes are those which contain polyvalent cations and which are selected from Groups II and III of the Periodic Table of Elements. Aluminum potassium sulfate and aluminum sulfate are particularly preferred in amounts preferably ranging from about 0.2 to 3 parts per 100 parts of polymer present in the emulsion. Other electrolytes which are suitable are $BaCl_2$, $MgSO_4$, $Mg(NO_3)_2$, hydrochloric acid or sulfuric acid. By conditioning for centrifuging, it is meant that the dispersed polymer partly agglomerates and, under the force created in a centrifuge, separates cleanly and rapidly from the supernatant liquid.

The conditioned emulsion is then centrifuged to separate the polymer from the supernatant liquid. Centrifuging for a period of about 30 seconds to 6 minutes at temperatures ranging from about 25° C. to 100° C. is preferred. It is also preferable to employ a centrifuge that develops a centrifugal force of about 2,000 to 4,000 times the force of gravity. The solids taken from the centrifuge, if somewhat tacky or lumpy, may be then masticated into a crumb to make it more granular. Mastication for a period of about 2 to 15 minutes at temperatures ranging from about 40° C. to 120° C. are preferred. This may be accomplished by any of a number of devices well known to those skilled in the art.

The polymer solids are washed with water to reduce the acidity of the polymer to less than about 0.07 milliequivalent of hydrogen ion per gram of polymer. The water temperatures may range from about 20° C. to 80° C. but will preferably be from about 40° C. to 60° C.

The washed polymer is then dried. This generally takes place in two steps: First, the reduction of the water content down to less than about 30% water (preferably about 20% water); this can be carried out in a centrifuge as described above. Secondly, the polymer is then dried in a conventional drier down to less than 1% water. It is preferred that the dried polymer be reduced to less than about 0.3% water and that the drying operation be conducted at a temperature ranging from about 40° C. to 85° C.

This invention not only enables the isolation of fluorine-containing polymers which are quite dry but also are free from undesirable quantities of electrolytes. It also provides a process wherein the polymer at each individual step thereof is uniquely suited by way of properties and physical condition to the performance of that step both as to quality and economy.

The invention will now be described in conjunction with a specific example thereof wherein parts and percentages are by weight unless otherwise specified.

EXAMPLE

A water emulsion containing about 20% of a vinylidene fluoride/hexafluoropropene copolymer is passed into an agitated aging kettle. The "aged" emulsion is then allowed to flow to a horizontal bowl centrifuge. During flow to the centrifuge, an electrolyte is metered into the emulsion, but the conditioning effected does not materially restrict the flow. During the flow to the centrifuge, a mixing of the electrolyte into the emulsion occurs for a period of about 60 seconds. The conditioned emulsion is centrifuged and the solids fed forward to a continuous masticating device. The masticating device "conditions" the solids which may have been tacky or lumpy into a uniform crumb. The crumb is then fed to an agitated vessel wherein it is washed with water at 50° C. in an amount of about 10 pounds of water per pound of polymer. The residence time for the polymer is about 16 minutes, and thereafter the slurry is pumped to another centrifuge of the same type. During the washing step, the polymer acidity is reduced from about 0.08 to about 0.06 milliequivalents of hydrogen ion per gram of polymer. The crumb is then dried in a conventional through-circulating continuous belt air drier. Typical operating conditions are shown below:

Flow rate of emulsion to age tank (lb./hr.): 700.
Feed stream temp. (° C.): 107.
Age tank temp. (° C.): 80.
Age tank pressure (p.s.i.g.): 25.
Aging time (hrs.): 2.4.
Electrolyte: Aluminum potassium sulfate.
Electrolyte per lb. polymer (lb.): 0.007.
Centrifugal force imposed (G's): 3,000.
Centrifuge hold time (min.): 3.
Mastication time (min.): 8.3.
Mastication temp. (° C.): 65.
Solids condition from mastication: Moist, granular.
Drying temp. (° C.): 80.
Drying time (hrs.): 6.

If, in the above example, the electrolyte is omitted, polymer does not separate readily and cleanly in the centrifuge and substantial amounts will be lost in the supernatant liquid.

The above specific operating conditions can be modified to accommodate the processing of different polymers or the use of different electrolytes (e.g., aluminum sulfate) or the employ of different times, temperatures, feed rates, etc. All these modifications are, of course, well within the skill of the art in view of the foregoing description of this invention.

As many widely different embodiments of this invention may be made without departing from the spirit and scope thereof, it is to be understood that this invention is not limited to the specific embodiments thereof except as defined in the appended claims, and all changes which come within the meaning and range of equivalents are intended to be embraced therein.

What is claimed is:

1. A process for isolating an elastomeric polymer of vinylidene fluoride/hexafluoropropene or vinylidene fluoride/hexafluoropropene/tetrafluoroethylene from their aqueous emulsions consisting essentially of (1) aging the emulsion for a sufficient time and temperature to partially destabilize the emulsion, thereafter (2) conditioning the emulsion for centrifuging by adding a water-soluble electrolyte, thereafter (3) centrifuging the conditioned emulsion to separate the polymer from the supernatant liquid, thereafter (4) washing the polymer solids with water to reduce the acidity below about 0.07 milliequivalent of hydrogen ion per gram of polymer, and (5) drying the polymer to a water content below about 1% by weight.

2. A process as defined in claim 1 wherein, after the centrifuging step (3), the polymer solids are masticated into a crumb before the washing step.

3. A process as defined in claim 2 wherein said drying step (5) consists essentially of (a) centrifuging the effluent from the washing step to reduce the water content of the polymer below about 30%, and (b) drying the polymer from step (a) at a temperature from about 40° C. to 85° C. to a water content less than about 0.3% by weight.

4. A process as defined in claim 1 wherein the amount of said electrolyte is from about 0.2 to 3 parts per 100 parts of polymer.

5. A process as defined in claim 1 wherein said polymer is a vinylidene fluoride copolymer containing hexafluoropropylene units.

6. A process as defined in claim 1 wherein said electrolyte has polyvalent cations of Groups II and III of the Periodic Table of Elements.

7. A process as defined in claim 4 wherein said electrolyte is aluminum potassium sulfate or aluminum sulfate.

References Cited

UNITED STATES PATENTS

| | | |
|---|---|---|
| 2,393,967 | 2/1946 | Brubaker. |
| 2,468,664 | 4/1949 | Hanford et al. |
| 2,738,343 | 3/1956 | Dittman et al. |
| 2,752,331 | 6/1956 | Dittman et al. |
| 2,833,752 | 5/1958 | Honn et al. |
| 2,965,619 | 12/1960 | Honn et al. |
| 2,968,649 | 1/1962 | Palthorp et al. |
| 3,051,677 | 8/1962 | Rexford. |
| 3,058,962 | 10/1962 | Trofimow _____ 260—87.7 |

JOSEPH L. SCHOFER, Primary Examiner

J. KIGHT, Assistant Examiner